UNITED STATES PATENT OFFICE.

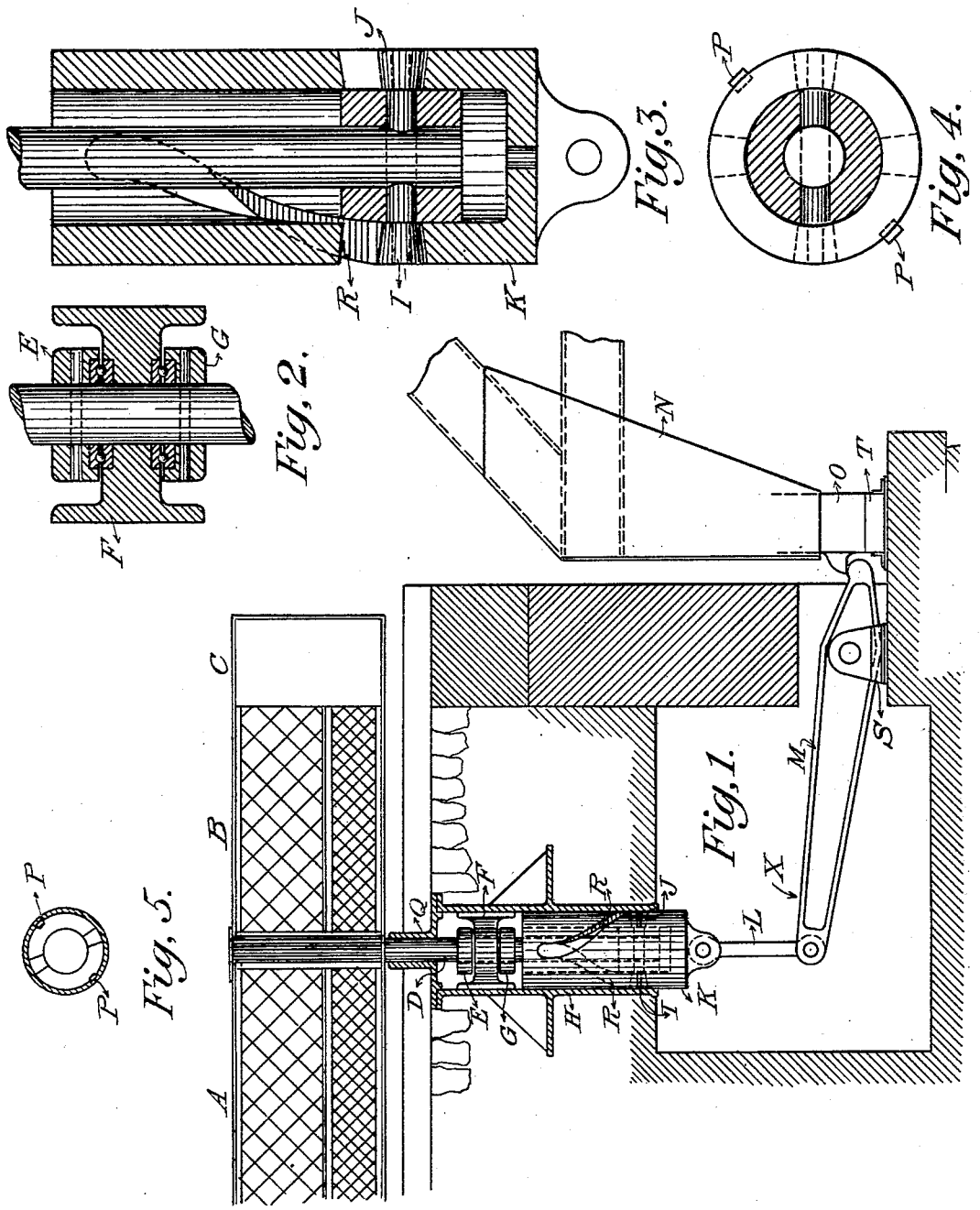

JOHN PHILO COWING, OF CLEVELAND, OHIO.

GATE FOR DRAWBRIDGES.

SPECIFICATION forming part of Letters Patent No. 653,729, dated July 17, 1900.

Application filed January 8, 1900. Serial No. 687. (No model.)

*To all whom it may concern:*

Be it known that I, JOHN PHILO COWING, of Cleveland, in the county of Cuyahoga and State of Ohio, have invented a new and useful Improvement in Gates for Drawbridges, of which the following is a full, clear, and exact description.

The object of the invention is to provide a new and improved gate more especially designed for use on draw or swing bridges and arranged to be automatically closed and locked immediately previous to starting the bridge for opening the same and to automatically open the gate after the bridge is closed.

The invention consists of novel features and parts and combinations of the same, as will be fully described hereinafter and then pointed out in the claims.

A practical embodiment of my invention is represented in the accompanying drawings, forming a part of this specification, in which similar characters of reference indicate corresponding parts in all views.

Figure 1 is a side elevation of the improvement as applied with parts in section. This view shows the gate open. Fig. 2 is an enlarged sectional view of the ball-bearing for supporting the vertical shaft. Fig. 3 is a sectional view of the sliding cylinder. Fig. 4 is a top view of sliding cylinder, showing enlarged part of shaft in section. Fig. 5 is a section showing keys for preventing the sliding cylinder from revolving about the shaft.

The gate illustrated in the drawings is provided with a roadway-section A for extending over the whole or half of the roadway to close the same, and a sidewalk-section B, adapted to extend over the sidewalk to close the same, C being a counterweight to counterbalance the longer roadway-section A.

The gate between the sections A and B is secured to a shaft D, mounted to turn in ball-bearings or fixed bearings F, attached to a fixed cylinder H, which is anchored in the masonry or fastened to a fixed part of the approach to the drawbridge. The lower end of the shaft D is provided with one or more friction-rollers J, engaging spiral grooves R in a movable cylinder K, said cylinder being connected to a lever M by link L. The said lever M is fulcrumed at S and is actuated in one direction by a vertically-movable part O of the drawbridge, or it may be actuated by means of latches, rail-locks, lifts, or other devices forming part of the drawbridge mechanism. The weight of the movable cylinder, together with the weight of the long arm of the lever, is made sufficiently heavy to pull the movable cylinder down when the movable part O of the drawbridge is raised off the end M' of the lever M, and thereby actuating the lever M in the direction shown by the arrow X, so that the lever M is actuated immediately previous to the opening of the drawbridge or immediately after the drawbridge is closed, as hereinafter fully described.

The shaft D is fixed against vertical motion by the bearings E, F, and G, but is free to revolve about the vertical axis of the shaft, the weight of the shaft being carried on ball-bearings, as shown in Fig. 2. The center of the bearing F pivotally supports the shaft D. The said bearing F is fastened to the fixed cylinder H, which supports the shaft D, carrying the gates. The upper part E of the bearing is fastened rigidly to the shaft D and rests on balls interposed between bearings E and F. The lower part G of the bearing is also fastened rigidly to the shaft D and bears on balls interposed between bearings F and G. This lower part of the bearing prevents the shaft from lifting up when the movable cylinder K is moved in an upward direction.

The shaft D carries one or more friction-rollers J, revolving on trunnions I and engaging spiral grooves R, formed in the moving cylinder K, so that when the lever M is swung in the direction of the arrow X, as shown in Fig. 1, then the link L and the movable cylinder K are moved downward, and the weight of the movable cylinder, together with the arm and the link L, will cause a turning motion to the gate, owing to the shaft being turned by the friction-rollers mounted on trunnions I, projecting from lower part of shaft D and traveling in spiral grooves. The gates A and B then swing into a closed position, the gate A swinging across the roadway and the gate B swinging across the sidewalk, so that the roadway and the sidewalk are closed to traffic and passengers.

The gate is held locked in either the open or closed position by the friction-rollers J being held in the spiral grooves R at the top when the gate is closed and at the bottom when the gate is opened.

The moving cylinder K is provided with keys P, fixed to the outside of the said cylinder and sliding in grooves in the fixed cylinder. (See Fig. 5.) These grooves prevent the sliding cylinder from revolving about the shaft D.

The end M' of the lever M extends into the path of a movable part O of the drawbridge mechanism, such as a toggle-head, rail-locks, or a latch, all of which are common to draw or swing bridges. The lever is shown in this case actuated by a movable toggle-head O. When it is desired to open the bridge, the mechanism of the bridge causes the toggle-head O to move in an upward direction out of engagement with the base-casting T to free the ends of the bridge and to then permit of swinging the bridge into an open position. When the said toggle-head moves upward, the lever M moves in the direction of the arrow X, and the weight of the movable cylinder K, together with link L and the arm M, causes the gates to close across the sidewalk and roadway. When it is desired to close the bridge, the mechanism of the bridge causes the toggle-head to move in a downward direction and forces the end M' of lever M down and causes the lever M to move in the reverse direction from the arrow X, which raises the movable cylinder and causes the gates to open the roadway and sidewalk for traffic and passengers. Thus the lever M is actuated immediately previous to opening the bridge or immediately after the bridge is closed. It is understood that usually two such movable toggle-heads O are on each end of the bridge to operate two levers M for two gates simultaneously.

I have described and shown one method of operating the gates; but it is evident that other constructions may be employed to accomplish the same end. For instance, some bridges are provided with wedges screwing under each corner of the bridge, and others with jack-screws consisting of a cam arrangement which when thrown into position wedges up the ends of the bridge. The gate can also be operated from a latch device frequently employed on swing-bridges to latch the bridge into position, and, if desired, the gate may be operated by an independent mechanism to force down the free end of the lever M. It is understood that in either case the gate is operated automatically upon releasing the lever M, and the gate is specially intended to be closed and locked across the roadway before the bridge commences to swing into an open position and cannot be opened until after the bridge is again closed and the lever M depressed at its free end.

As shown in the drawings, a counterbalanced gate for both roadway and sidewalk is provided; but it is evident that the improvement can be used on gates of different construction and arranged for different purposes.

Having thus described my invention, I claim as new and desire to secure by Letters Patent—

1. A bridge-gate comprising parts A and B; a shaft D carrying the gates; a movable cylinder K containing spiral grooves R; a connecting-lever L, and a pivoted lever M, with mechanism operating in conjunction with the opening and closing of a drawbridge, to impart a rotary motion to the said shaft D before the opening movement of the bridge which will cause said gates to close across the roadway of the bridge, and to impart a rotary motion to said shaft D after the closing movement of the bridge is completed, which will cause the gates to open the roadway of the bridge, substantially as shown and described.

2. In a drawbridge-gate the combination of a shaft D, mounted to turn in fixed bearings E, F, G; a gate carried by said shaft; a movable cylinder K containing spiral grooves; friction-rollers projecting from lower end of shaft D; a pivoted lever M; a connection between lever M and movable cylinder K and arranged to be operated from the mechanism of a swing-bridge to automatically operate the said lever prior to the opening movement and after the closing movement thereof is completed, substantially as shown and described.

3. In a drawbridge-gate, the combination of a shaft carrying gates, mounted to turn in bearings E, F, G, and having at its lower end rollers revolving on trunnions and rolling in spiral grooves R, in moving cylinder K, which imparts a rotary motion to the shaft when the cylinder K is moved up or down; and to close or open the gates, substantially as shown and described.

4. In a drawbridge-gate, the combination of a shaft mounted to turn in fixed bearings; a gate carried by said shaft; a movable cylinder provided with a spiral groove to receive a projection at the lower end of said shaft; a lever having one end extending into and under the path of a movable part O of a drawbridge mechanism and a link connecting the other end of the lever with said moving cylinder, substantially as shown and described.

5. A bridge-gate, comprising a gate having a shaft mounted to turn in fixed bearings, and having at its lower end friction-rollers journaled on projections from said shaft; a moving cylinder having a spiral groove which imparts a rotary motion to the said shaft, and a fixed cylinder H, with keyways to receive keys P, which causes the moving cylinder to slide in the fixed cylinder without rotating.

6. A bridge-gate, comprising a gate having a shaft mounted to turn in fixed bearing F having an upper portion E fastened to the shaft and a lower portion G fastened to the shaft and each provided with ball-races between which are interposed antifriction-balls journaled on projections from said shaft; a moving cylinder having a spiral groove which imparts a rotary motion to the said shaft, and a fixed cylinder H with keyways to receive keys P which causes the moving cylinder to slide in the fixed cylinder without rotating.

JOHN PHILO COWING.

Witnesses:
A. H. PORTER,
F. M. SEDGWICK.